(12) United States Patent
Makitani

(10) Patent No.: US 7,106,463 B1
(45) Date of Patent: Sep. 12, 2006

(54) CONTROLLING PACKET LENGTH FOR TRANSFER BETWEEN DEVICES

(75) Inventor: Hideyuki Makitani, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 1089 days.

(21) Appl. No.: 09/612,571

(22) Filed: Jul. 7, 2000

(30) Foreign Application Priority Data

Jul. 9, 1999 (JP) ............................. 11-196498
Jul. 4, 2000 (JP) ............................. 2000-202361

(51) Int. Cl.
*G06F 15/00* (2006.01)
*G06K 1/00* (2006.01)

(52) U.S. Cl. ................. 358/1.15; 358/1.16; 358/1.17

(58) Field of Classification Search ............ 358/1.15, 358/1.9, 1.11–1.14, 1.16–1.18, 1.1; 370/394, 370/395.1, 395.52, 912

See application file for complete search history.

(56) References Cited

U.S. PATENT DOCUMENTS 5,815,283 A * 9/1998 Watanabe et al. ........... 358/296

6,665,082 B1 * 12/2003 Takeoka et al. ............ 358/1.15

FOREIGN PATENT DOCUMENTS

EP 540378 A2 * 5/1993

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

An image processing system comprising a combination of an image control unit and one or a plurality of image input/output units, wherein the image control unit and image input/output unit are connected by communication means. In a case where the image control unit has a first communication controller and the image input/output unit has a second communication controller, predetermined communication conditions are set in the first and second communication controllers at initialization, a fixed packet length is decided based upon mutually communicable packet lengths of packets exchanged via the communication means, the decided fixed packet length is set in the first and second communication controllers anew, and subsequent communication is continued by DMA transfer in which a data string is divided into the set fixed packet lengths. As a result, high-speed data communication is achieved between units even in a low-cost single-chip microcontroller.

14 Claims, 8 Drawing Sheets

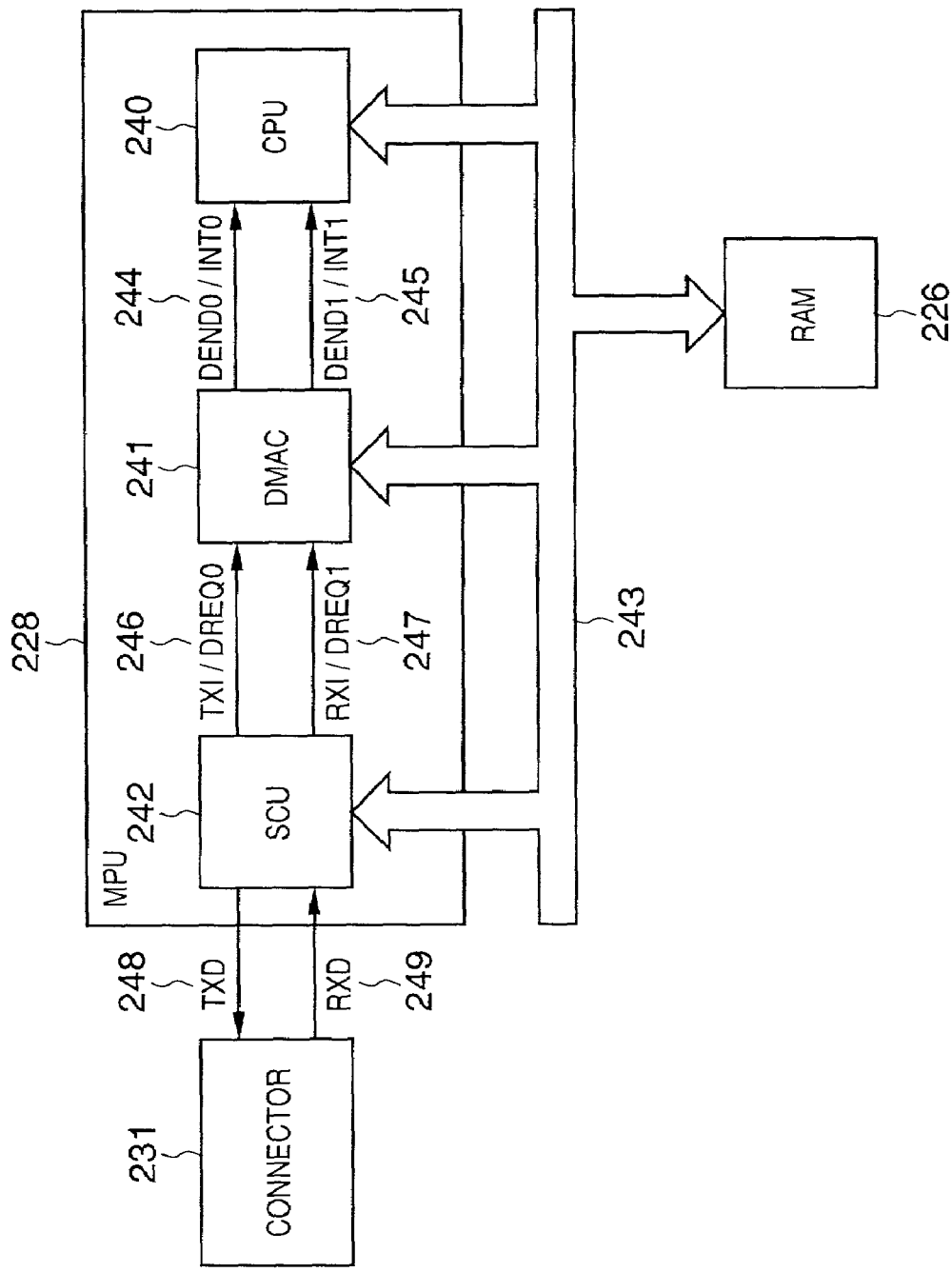

CONTROLLING PACKET LENGTH FOR TRANSFER BETWEEN DEVICES

FIELD OF THE INVENTION

This invention relates to a method and system for data communication between devices and, more particularly, to a data communication method in an image processing system comprising an image input/output unit and an image control unit.

BACKGROUND OF THE INVENTION

In a system of the kind in which an image input/output unit and an image control unit, for example, are controlled by independent CPUs, the conventional practice when sending and receiving variable-length messages between the units is for the CPUs to control communication controllers on per-byte (eight-bit) basis.

In this example of the prior art, a CPU interrupt is generated byte by byte. When data communication takes place at high speed, therefore, some data may failed to be acquired and other processing by the CPU may be adversely affected. Depending upon the communication controller, it is possible to use a FIFO buffer to reduce the frequency with which CPU interrupt occurs, though often the communication controller that is incorporated within a low-cost single-chip microcontroller does not come equipped with this function. A microcontroller that is available can perform data transfer without the intervention of a CPU by using a combination of a DMA controller and a communication controller. However, since the length of received messages is indeterminate, the DMA transfer length cannot be set in advance. This necessitates an operation in which a CPU polls the counter of the DMA controller. Such a microcontroller, therefore, is not suitable for receiving variable-length messages as is.

Meanwhile, there is a tendency for the amount of data transferred between devices to increase as functions become more sophisticated. For example, when the image processing speed of an image input/output unit rises, communication time allowed for control between pages tends to shorten. Hence there is a demand for ever higher data communication speed.

SUMMARY OF THE INVENTION

Accordingly, an object of the present invention is to provide a method and system for data communication between devices, wherein by adopting a scheme in which a variable-length message is transferred upon being divided into fixed-length packets, it is possible to combine and control a DMA controller and a communication controller, thereby achieving high-speed data communication, even in a low-cost single-chip microcomputer.

According to the present invention, the foregoing object is attained by providing an image processing system comprising a combination of an image control unit and one or a plurality of image input/output units, wherein the image input/output unit and the image control unit are connected by communication means, the image control unit has first communication control means connected to the communication means, the image input/output unit has second communication control means connected to the communication means, and the system further includes control means for performing control so as to set predetermined communication conditions in the first and second communication control means at initialization, decide fixed packet length based upon mutually communicable packet lengths of packets exchanged via the communication means, set the decided fixed packet length in the first and second communication control means anew, and continue subsequent communication by DMA transfer in which a data string is divided into the set fixed packet lengths.

In a case where the data string is a variable-length message, the control means performs control in such a manner that a transmitting side adds information indicative of the end of a message onto a final packet when the variable-length message is transmitted upon being divided into fixed-length packets, and a receiving side reproduces the original variable-length message after recognizing added-on final-packet information. Further, the control means includes first control means in the image control unit for controlling the first communication control means, and second control means in the image input/output unit for controlling the second communication control means. Further, the decision of the fixed packet length is made by the first control means. Further, the decision of the fixed packet length is made by the second control means. Further, the fixed packet length decided upon is whichever of the packet lengths of respective ones of the first and second communication control means is smaller than an upper-limit value. Further, an image reading unit is connected as the image input/output unit and the system operates as an image reading system. Further, an image forming unit is connected as the image input/output unit and the system functions as an image forming system. Further, an image reading unit and an image forming unit are connected as the image input/output units and the system functions as an image input/output system. Further, start-stop synchronization serial communication means is used as the communication means, a serial communication controller and a DMA controller are combined as the communication control means, the DMA controller transfers data by the fixed-length packets in accordance with a data transfer request from the serial communication controller and interrupts the image control unit when transfer of the fixed-length packet is completed.

Further, the present invention provides a system constructed by combining a plurality of devices and connecting them by communication means, wherein a first device has first communication control means connected to the communication means, a second device has second communication control means connected to the communication means, and the system further includes control means for performing control so as to set predetermined communication conditions in the first and second communication control means at initialization, decide fixed packet length based upon mutually communicable packet lengths of packets exchanged via the communication means, set the decided fixed packet length in the first and second communication control means anew, and continue subsequent communication.

In a case where a data string is a variable-length message, the control means performs control in such a manner that a transmitting side adds information indicative of the end of a message onto a final packet when the variable-length message is transmitted upon being divided into fixed-length packets, and a receiving side reproduces the original variable-length message after recognizing added-on final-packet information.

Further, the present invention provides a data communication method in an image processing system comprising a combination of an image control unit and one or a plurality of image input/output units, the image input/output unit and the image control unit being connected by communication means, wherein in a case where the image control unit has first communication control means connected to the communication means and the image input/output unit has second communication control means connected to the communication means, the method comprises an initial communication conditions setting step of setting predetermined communication conditions in the first and second communication control means at initialization; a fixed packet length deciding step of deciding fixed packet length based upon mutually communicable packet lengths of packets exchanged via the communication means; and a fixed packet length setting step of setting the decided fixed packet length in the first and second communication control means anew and continuing subsequent communication by DMA transfer in which a data string is divided into the set fixed packet lengths.

In the fixed-packet length deciding step, the fixed packet length decided upon is whichever of the packet lengths of respective ones of the first and second communication control means is smaller than an upper-limit value. Further, after the fixed packet length has been set anew, communication is resumed upon elapse of a predetermined period of time. Further, start-stop synchronization serial communication means is used as the communication means, a serial communication controller and a DMA controller are combined as the communication control means, the DMA controller transfers data in the fixed-length packet in accordance with a data transfer request from the serial communication controller and interrupts the image control unit when transfer of the fixed-length packet is completed.

Further, the present invention provides a data communication method in a system constructed by combining a plurality of devices and connecting them by communication means, wherein in a case a first device has first communication control means connected to the communication means and a second device has second communication control means connected to the communication means, the method comprises the steps of: setting predetermined communication conditions in the first and second communication control means at initialization; deciding fixed packet length based upon mutually communicable packet lengths of packets exchanged via the communication means; and setting the decided fixed packet length in the first and second communication control means anew and continuing subsequent communication.

In a case where a data string is a variable-length message, a transmitting side adds information indicative of the end of a message onto a final packet when the variable-length message is transmitted upon being divided into fixed-length packets, and a receiving side reproduces the original variable-length message after recognizing added-on final-packet information.

Further, the present invention provides a storage medium storing a computer-readable communication control program of an image processing system comprising a combination of an image control unit and one or a plurality of image input/output units, the image input/output unit and the image control unit being connected by communication means, wherein in a case where the image control unit has first communication control means connected to the communication means and the image input/output unit has second communication control means connected to the communication means, the communication control program includes an initial communication conditions setting step of setting predetermined communication conditions in the first and second communication control means at initialization; a fixed packet length deciding step of deciding fixed packet length based upon mutually communicable packet lengths of packets exchanged via the communication means; and a fixed packet length setting step of setting the decided fixed packet length in the first and second communication control means anew and continuing subsequent communication by DMA transfer in which a data string is divided into the set fixed packet lengths.

The communication control program includes a program in the image control unit executed by a first control unit for controlling the first communication control means, and a program in the image input/output unit executed by a second control unit for controlling the second communication control means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a block diagram illustrating a detailed arrangement relating to communication control in the reader according to this embodiment;

DESCRIPTION OF THE PREFERRED EMBODIMENTS

<Example of System Configuration According to this Embodiment>

An example of the overall configuration of an image input/output system serving as an image processing system according to an embodiment of the present invention will be described with reference to FIG. 1. Though the description of this embodiment is rendered based upon an image input/output system, the technical concept of the present invention is applicable to systems relating to the setting of communication conditions in a case where a plurality of devices having different capabilities are connected to a single device, and the present invention covers these systems.

Figure 1:
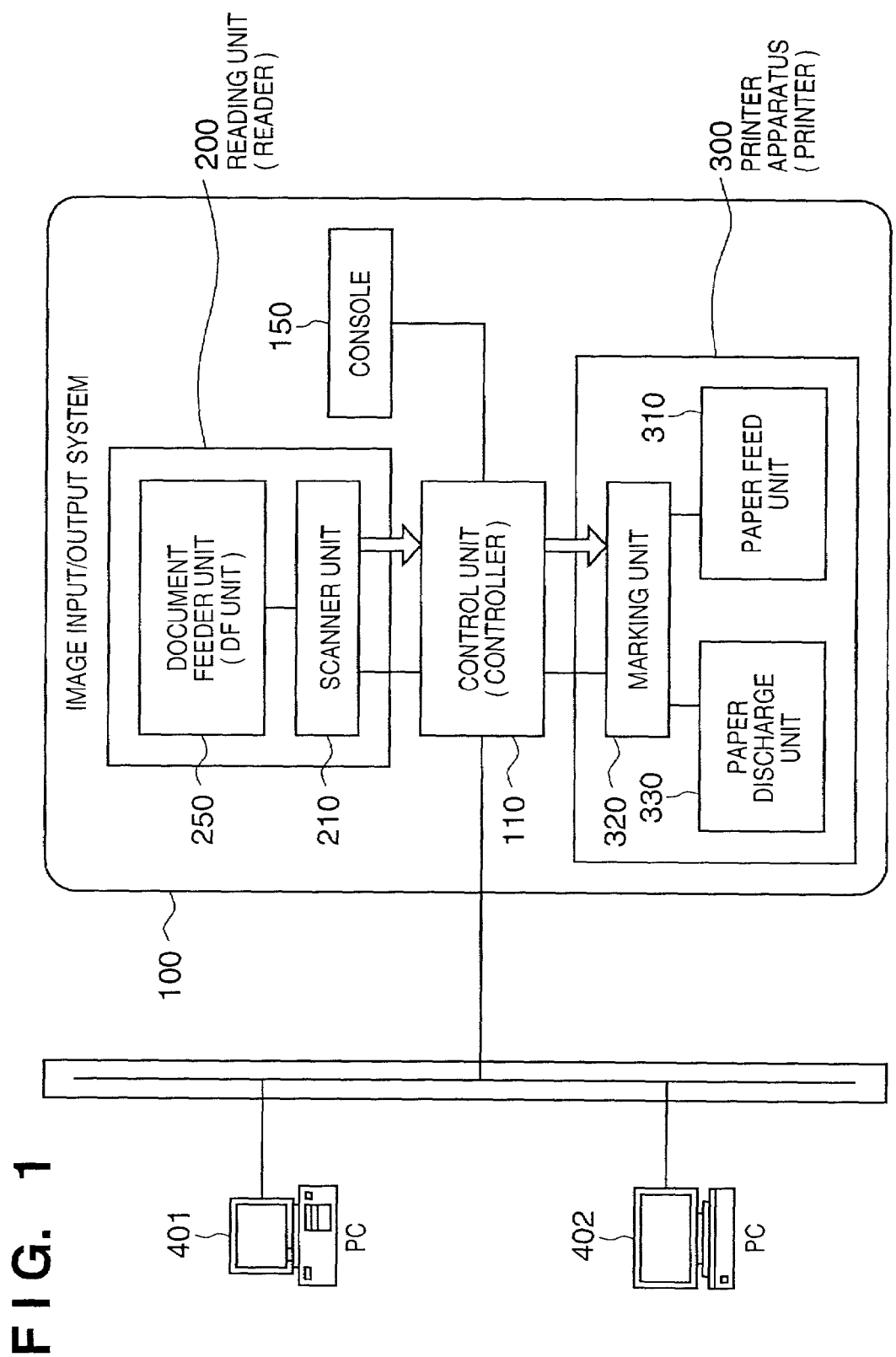
FIG. 1 is a block diagram illustrating an example of the control components of an image input/output system according to an embodiment of the present invention.

As shown in FIG. 1, a reader (image input unit) 200 reads a document image optically and converts the image to image data. The reader 200 is constituted primarily by a scanner unit 210 having a function for reading a document, and a document feeder unit 250 having a function for transporting the paper sheets of the document.

A printer (image output unit) 300 transports printing paper, prints image data on the printing paper in the form of a visible image and discharges the paper to the exterior of the apparatus. The printer 300 is constituted primarily by a paper feed unit 310 having printing paper cassettes of a plurality of types, a marking unit 320 having a function for transferring image data to printing paper and fixing the image on the paper, and a paper discharge unit 330 having a function for sorting printing paper that has been printed on, stapling the paper and outputting the stapled paper to the exterior of the apparatus.

A controller (image control unit) 110 is electrically connected to the reader 200 and printer 300 and is further connected to host computers 401 and 402 via a network 400.

The controller 110 controls the reader 200 to read in image data representing a document and controls the printer 300 to output image data to printing paper, thereby providing a copy function. The controller 110 further provides a scanner function for converting read image data from the reader 200 to code data and transmitting the code data to the host computers via the network 400, and a printer function for converting code data received from a host computer via the network 400 to image data and outputting the image data to the printer 300.

A console 150, which is connected to the controller 110, is constituted by a liquid-crystal touch-sensitive panel to provide a user interface for operating the image input/output system.

Figure 2:
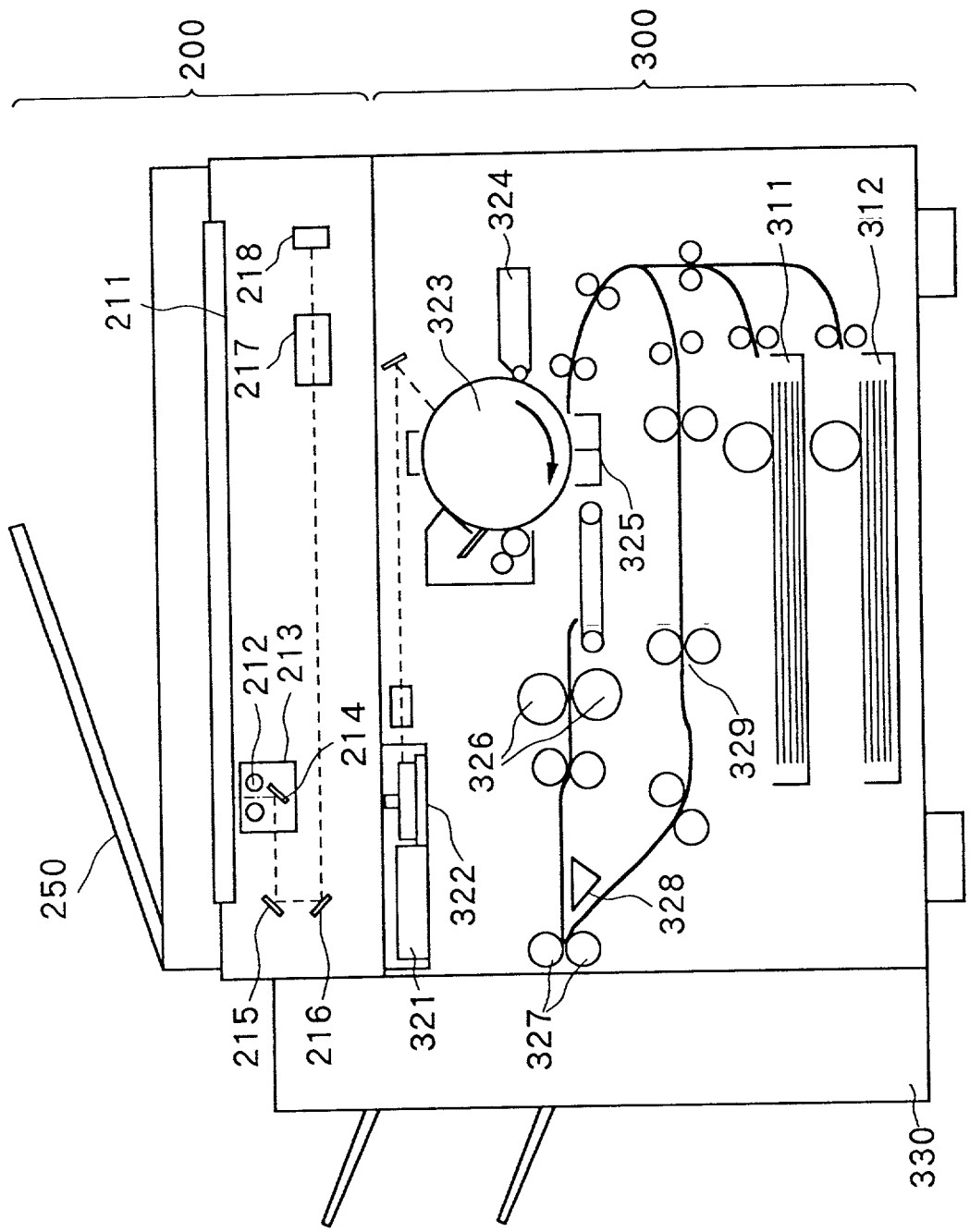
FIG. 2 is a sectional view showing an example of the configuration of the image input/output system according to this embodiment.

FIG. 2 is a sectional view showing the construction of the reader 200 and printer 300.

(Example of Construction of Reader)

The document feeder unit 250 of the reader feeds documents to the top of a platen glass one sheet at a time in order starting from the first sheet and then discharges the documents from the platen glass 211 when the reading of the documents is completed. When a document is transported to the top of the platen glass 211, a lamp 212 is lit and an optics unit 213 is caused to start moving so that the document is exposed and scanned. Light reflected from the document at this time is introduced to a CCD image sensor (referred to as a "CCD" below) 218 by mirrors 214, 215, 216 and a lens 217. Thus, the image of the scanned document is read by the CCD 218. Image data output from the CCD 218 is subjected to predetermined processing and then transferred to the controller 110.

(Example of Construction of Printer)

A laser driver 321 in the printer 300 drives a laser emission unit 322. Specifically, the laser driver 321 causes the laser emission unit 322 to emit laser light that conforms to the image data that has been output from the controller 110. The laser light irradiates a photosensitive drum 323 so that a latent image conforming to the laser light is formed on the drum 323. A developing unit 324 causes a developing agent to attach itself to the latent image formed on the photosensitive drum 323.

Printing paper is transported to a transfer unit 325 from a cassette 311 or 312 at a timing synchronized to the start of irradiation by the laser light, as a result of which the developing agent affixed to the photosensitive drum 323 is transferred to the printing paper. The printing paper to which the developing agent has been transferred is transported to a fixing unit 326, where the developing agent is fixed on the printing paper by heat and pressure supplied by the fixing unit 326. Upon passing through the fixing unit 326, the printing paper is ejected by ejection rollers 327. A paper discharge unit 330 gathers the discharged sheets of paper together, sorts the sheets and staples sheets that have been sorted.

If the apparatus has been set to a double-sided printing mode, the printing paper is transported up to the position of the ejection rollers 327, the rotating direction of the ejection rollers 208 is reversed and the paper is introduced to a paper re-feed path 329 by a flapper 328. Printing paper thus rintroduced to the paper re-feed path 329 is fed to the transfer unit 325 at the above-mentioned timing.

(Example of Construction of Controller)

Figure 3:
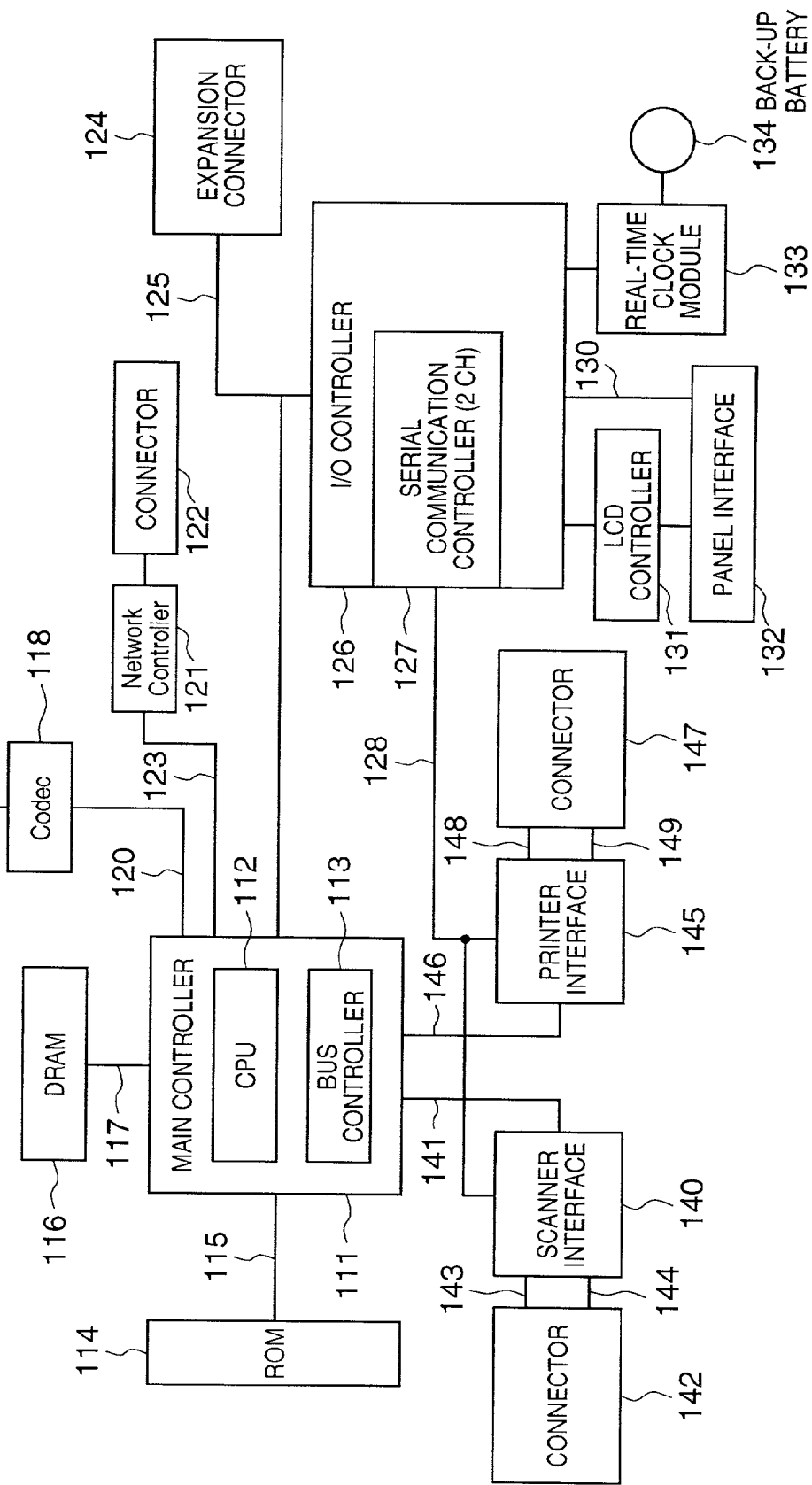
FIG. 3 is a block diagram showing an example of the construction of a controller according to this embodiment.

An example of the functions of the controller 110 will be described with reference to the block diagram of FIG. 3.

A main controller 111 is constituted primarily by a CPU 112, a bus controller 113 and various interface control circuits (not shown).

The CPU 112 and the bus controller 113 control the overall operation of the controller 110. The CPU 112 operates on the basis of a program read in from a ROM 114 via a ROM interface 115. An operation for analyzing PDL (Page Description Language) code data received from a host computer and expanding the code data into raster image data also is described in this program and is implemented by software. A bus controller 113 controls the transfer of data input to and output from various interfaces, performs arbitration at the time of bus contention and controls DMA data transfer.

A DRAM 116, which is connected to the main controller 111 by a DRAM interface 117, is used as a work area for operation of the CPU 112 and as a work area for storing image data. As will be described later, an arrangement may be adopted in which a program is loaded in the DRAM 116 from a host computer or external storage device (which has been connected to, e.g., an expansion connector 124) such as a floppy disk or CD, and the program is run by the CPU 112.

A codec 118 compresses raster-image data, which has been stored in the DRAM 116, by a compression scheme such as MH, MR, MMR or JBIG, etc., and expands code data, which has been compressed and stored, to raster-image data. An SRAM 119 is used as a temporary work area of the codec 118. The codec 118 is connected to the main controller 111 via an interface 120, and the transfer of data between the codec and the DRAM 116 is controlled by a bus controller 113, whereby DMA transfer is achieved.

A network controller 121 is connected to the main controller 111 by an interface 123 and is connected to an external network by a connector 122. Ethernet is an example of the external network.

The expansion connector 124 for connecting an expansion port and an input/output controller 126 are connected to a general-purpose high-speed bus 125. A PCI bus is an example of the general-purpose high-speed bus.

The input/output controller 126 is equipped with a start-stop synchronization serial communication controller 127 in two channels for sending and receiving control commands to and from the CPUs of the reader 200 and printer 300. The start-stop synchronization serial communication controller 127 is connected to external interface circuits 140, 145 by an input/output bus 128.

A panel interface 132 comprises an interface connected to an LCD controller 131 for presenting a display on the liquid-crystal screen of the console 150, and a key-input interface 130 for allowing input from hard keys and keys on a touch-sensitive panel.

The console 150 has a liquid-crystal display unit, a touch-sensitive panel affixed to the liquid-crystal display unit, and a plurality of hard keys. Signals that have been entered from the touch-sensitive panel or hardware keys are sent to the CPU 112 via the panel interface 132. The liquid-crystal display unit displays image data that has been sent from the panel interface 132. Functional displays for operating this image forming apparatus and displays of image data and the like are presented on the liquid-crystal display unit.

A real-time clock module 133 updates/saves date and time managed within the apparatus and is backed up by a back-up battery 134.

Connectors 142 and 147 comprise start-stop synchronization serial interfaces (143, 148) and video interfaces (144, 149) connected to the reader 200 and printer 300, respectively.

A scanner interface 140 is connected to the reader 200 via the connector 142 and to the main controller 111 by a scanner bus 141. Depending upon the content of processing in subsequent processes, the scanner interface 140 subjects an image received from the reader 200 to optimum binarization or to scaling processing for main and sub-scans. The scanner interface 140 further functions to output, to the scanner bus 141, a control signal that has been generated based upon a video control signal sent from the reader 200.

Transfer of data from the scanner bus 141 to the DRAM 116 is controlled by the bus controller 113.

A printer interface 145 is connected to the printer 300 via the connector 147 and to the main controller 111 by a printer bus 146. The printer interface 145 functions to apply smoothing processing to image data output from the main controller 111 and to output the processed data to the printer 300, and functions also to output, to the printer bus printer bus 146, a control signal that has been generated based upon a video control signal sent from the printer 300.

Transfer of raster-image data, which has been expanded in the DRAM 116, to the printer is controlled by the bus controller 113, and DMA transfer to the printer 300 is performed via the printer bus 146 and video interface 149.

(Detailed Description of Reader)

Figure 4:
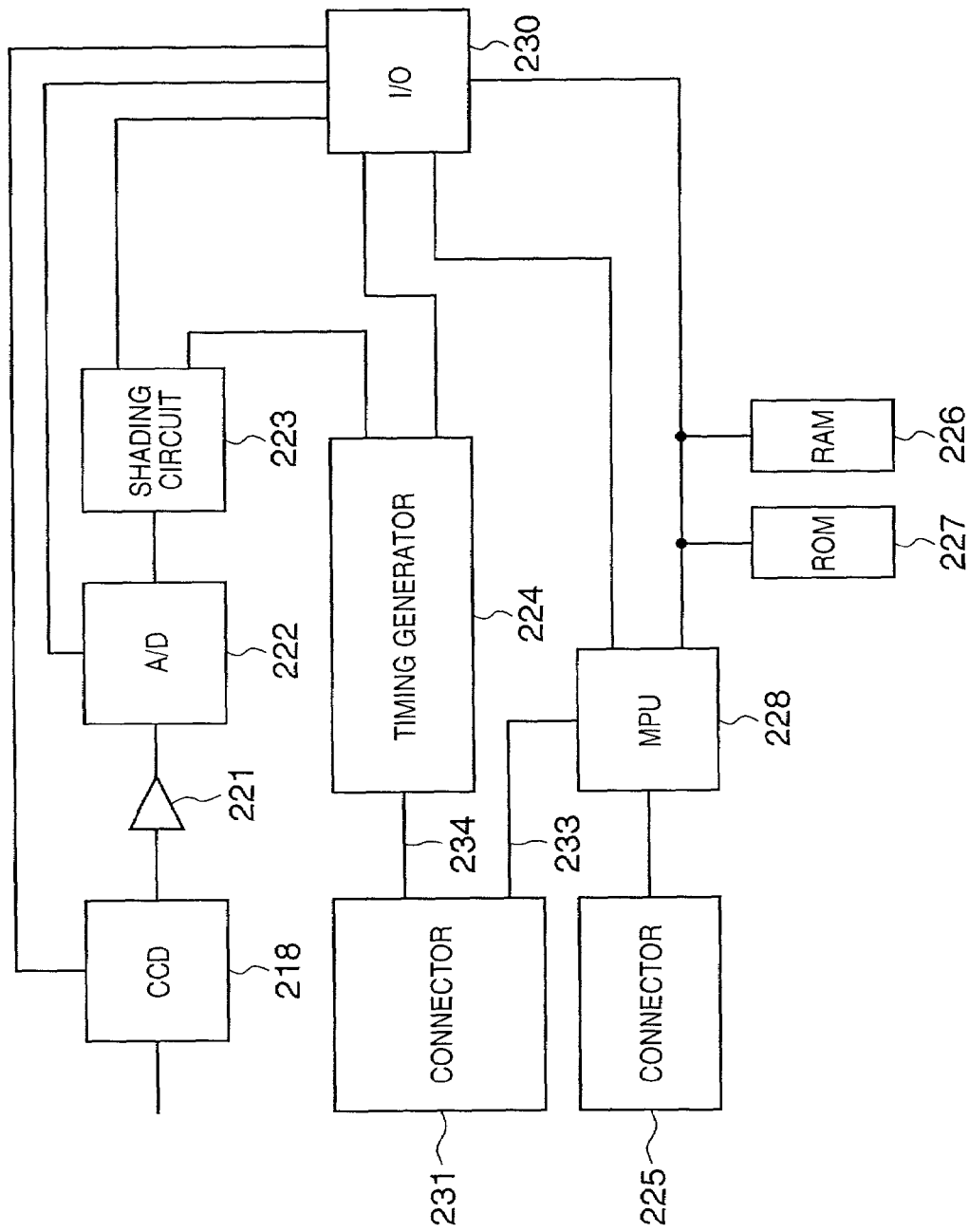
FIG. 4 is a block diagram showing an example of the construction of a reader according to this embodiment.

A more detailed example of the functional construction of the reader will now be described with reference to the block diagram of FIG. 4.

A connector 231 is connected to the connector 142 of the controller 110 and is constituted by the start-stop synchronization serial interface 233 for communication of commands between the CPU 112 and an MPU 228, and the video interface 234 for transferring video signals.

The MPU 228, which is a single-chip CPU for performing overall control of the scanner reader, internally incorporates the functions of a timer, a DMAC, a serial communication controller (SCU) and an general-purpose input/output port, etc.

A connector 225 is connected to the document feeder unit (referred to as a "DF unit" below) 250. In order that a reading operation may be performed, the MPU 228 requests the DF unit 250 to feed the paper sheets of a document. In response to the request, the DF unit 250 controls an accompanying motor to implement the document-feed operation.

A CCD driver is incorporated within or connected to a CCD 218 and is controlled by the MPU 228 via an I/O unit 230. Image data that has been input to the CCD 218 is photoelectrically converted to an electric signal. The electric signal output from the CCD 218 is amplified by an amplifier 221 and then input to an A/D converter 222. The A/D converter 222 converts the entered analog electric signal to a digital signal and outputs the digital signal. The output signal from the A/D converter 222 enters a shading circuit 223, where non-uniformity in distribution of light and sensitivity unevenness of the CCD are corrected.

The output of the shading circuit 223 is input to a timing generator 224 and is transferred to the controller 110 via the connector 231 in sync with video control signals (HYSNC/VSYNC) generated by the timing generator 224.

A ROM 227 is a medium for storing the control program of the scanner unit 210. Processing by the MPU 228 is executed based upon this program. A RAM 226 is used as a work area when the MPU 228 executes processing. An arrangement may be adopted in which the program run by the MPU 228 is loaded into the RAM 226 from the controller 110 or from a host computer or external storage device via the controller 110.

The communication function of the reader 200 will now be described based upon the block diagram of FIG. 5.

Among the functions incorporated within the MPU 228, a CPU 240, a DMAC 241 and an SCU 242 are illustrated in the block diagram of FIG. 5. These functional blocks are connected to the RAM 226 via an address/data bus 234. A detailed description regarding the sending and receiving of data in the usual (i.e., without the intermediary of a DMAC) one-byte units is not given here as such a scheme is ordinary. What will be described in detail here is operation in which the DMAC and SCU are combined.

First, in regard to a transmitting operation, the CPU 240 sets the length of data transmitted in a channel-0 transfer-length register of the DMAC 241 and sets the leading address of the transmit data string of RAM 226 in a channel-0 address register of the DMAC 241. When a transfer-start command is applied to the SCU 242, the latter makes TRUE a transfer request TXI (246) to the DMAC 241 successively in single-byte units. The transfer request TXI is connected to a channel-0 DMA request (DREQ0; 246) of the DMAC 241. When the DMA request becomes TRUE, the DMAC 241 controls the address/data bus 243 in accordance with information that has been set and effects a data transfer from the RAM 226 to the SCU 242. The SCU 242 converts the received one byte of data to a bit sequence and outputs the bit sequence to a TXD terminal 248 in a predetermined format. When a prescribed number of transfers have been completed, the DMAC 241 makes DEND0 (244) TRUE and notifies the CPU 240 of the end of transmission. The CPU 240 senses end of transmission by the signal on an interrupt terminal INT0 (244).

Next, in regard to a receiving operation, the CPU 240 sets the length of a fixed-length packet in a channel-1 transfer-length register of the DMAC 241 and sets the leading address of a receive buffer of RAM 226 in a channel-1 address register of the DMAC 241. When a bit sequence is received from an RXD terminal 249, the SCU 242 converts this to byte data and then makes TRUE a transfer request RXI (247) to the DMAC 241. The RXI (247) is connected to a channel-1 DMA request (DREQ1; 247) of the DMAC 241. When the DMA request becomes TRUE, the DMAC 241 controls the address/data bus 243 in accordance with information that has been set and effects a data transfer from the SCU 242 to the RAM 226. When reception of the prescribed number has been completed, the DMAC 241 makes DEND1 (245) TRUE and notifies the CPU 240 of the end of transmission. The CPU 240 senses end of transmission. The CPU 240 senses end of reception by the signal on an interrupt terminal INT1 (245).

<Example of Operation of System According to this Embodiment>

Described next will be a procedure for transferring a variable-length message by a fixed-length scheme between the image control unit and the image input/output unit.

Figure 6A:
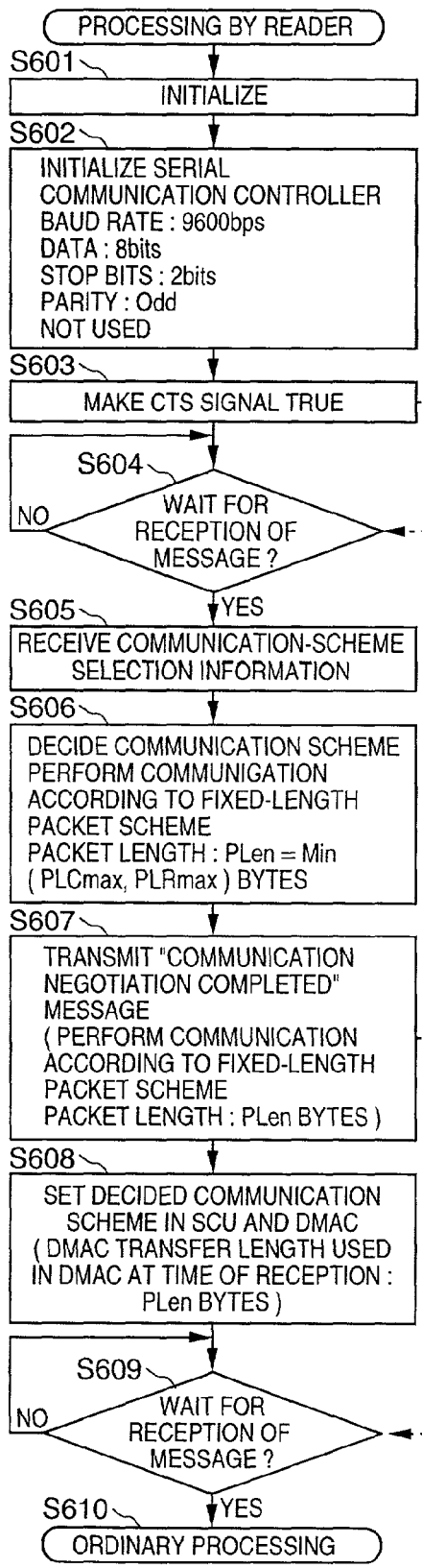
FIGS. 6A and 6B are flowcharts illustrating an example of processing for deciding communication conditions according to this embodiment.
Figure 6B:
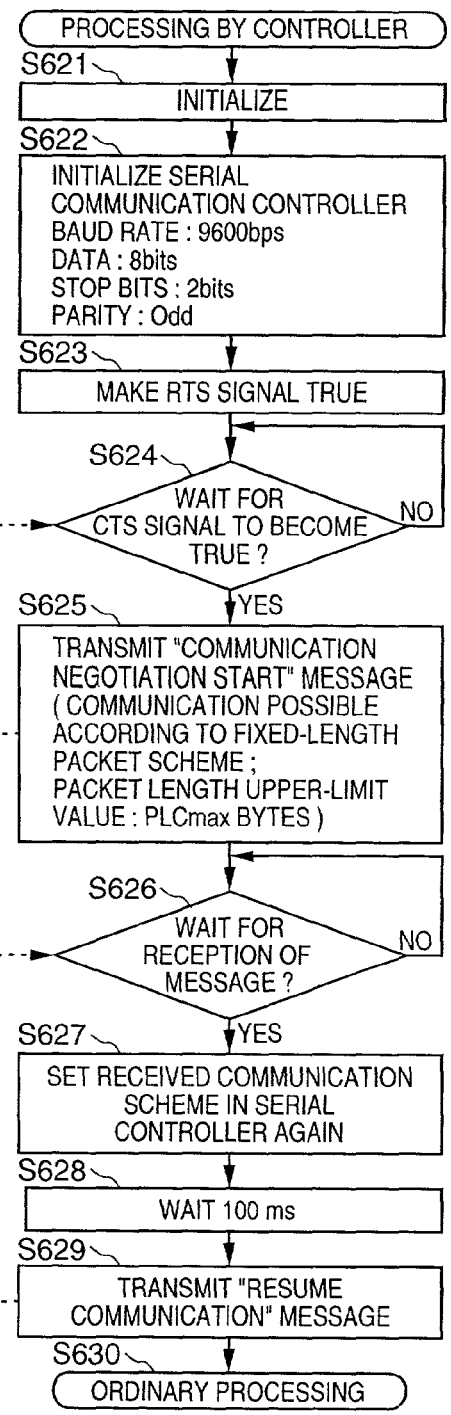

In this example, a procedure through which the CPU 112 (FIG. 3) of the control unit (controller) 110 and the CPU 240 (FIG. 5) of the reader 200 select the fixed-length packet scheme at the time of initialization and a transfer procedure based upon the fixed-length packet scheme will be described with reference to the flowcharts shown in FIGS. 6 and 7. It should be noted, however, that a technical concept similar to that of the example of FIGS. 6 and 7 is applicable to determination of communication conditions between the printer and controller of this example and to determination of communication conditions in a system in which a plurality of devices have been connected via other communication means. In FIGS. 6A and 6B, the dashed-line arrows between FIG. 6A and FIG. 6B indicate communication between the reader and controller.

(Operation of Reader)

A communication-scheme determination sequence in the reader 200 shown in FIG. 1 will be described first with reference to the flowchart shown in FIG. 6A.

In FIG. 6A, the RAM and various peripheral circuits are initialized when power is applied (S601). Next, the serial communication controller (SCU) 242 is initialized according to predetermined conditions (S602). In this embodiment, the conditions set are a baud rate of 9600 bps, data of eight bits, stop bits of two bits and odd parity. Further, the SCU 242 is configured so as to operate in direct connection with the CPU 240 without the intermediary of the DMAC 241.

Next, in order to inform the controller 110 of the fact that message reception has become possible, a CTS signal, which is a flow-control signal, is made TRUE (S603) and a message-reception standby state is attained (S604).

The reader receives a "communication negotiation start message" from the controller 110 and accepts information indicating "communication possible/impossible according to fixed-length packet scheme" and an upper-limit value (PLCmax) of the length of the fixed-length packet, which are contained in the message (step S605). In this example, the information "communication possible according to fixed-length packet scheme" and "upper-limit value of packet length is PLCmax bytes" is delivered to the reader 200 from the controller 110. The reader 200 compares this information with its own capabilities, namely whether fixed-length communication is possible/impossible and the maximum allowable value (PLRmax) of packet length and decides the final communication conditions (S606). In this example, it is decided to "perform communication according to fixed-length packet scheme" and the smaller of PLCmax and PLRmax is adopted to decide packet length PLen. For example, if PLCmax is 16 bytes and PLRmax is 8 bytes, then 8 bytes is adopted as the packet length.

Next, the reader transmits the above-mentioned communication conditions to the controller 110 together with a "communication negotiation completed" message (S607).

If transmission of the message is completed, then reception by DMA is set in the SCU 242 and DMAC 241 (S608: set DMA transfer length to PLen bytes). This is followed by waiting for a "resume communication" message from the controller 110 (S609). When the "communication resumed" message is received from the controller 110, ordinary processing is started (S610).

(Operation of Controller)

Next, a communication-scheme determination sequence in the controller 110 shown in FIG. 1 will be described with reference to the flowchart shown in FIG. 6B.

In FIG. 6B, the RAM and various peripheral circuits are initialized when power is applied (S621). Next, the serial communication controller 127 is initialized according to predetermined conditions (S622). In this embodiment, the conditions set are a baud rate of 9600 bps, data of eight bits, stop bits of two bits and odd parity.

Next, in order to inform the reader 200 of the fact that message reception has become possible, an RTS signal, which is a flow-control signal, is made TRUE (S623) and the controller waits for the reader to attain a state in which reception is possible (S624).

After it is recognized that the CTS signal has become TRUE, the controller transmits a "communication negotiation start message" (S625). The communication scheme allowed by the controller is attached to this message as a parameter. In this example, the information "communication possible according to fixed-length packet scheme" and "upper-limit value of packet length is PLCmax bytes" is delivered.

Next, the controller awaits an answer message from the reader (S626). When the "communication negotiation completed" message is received, the communication controller 127 is set again based upon the communication scheme that was added on as the parameter (S627).

Next, the controller waits 100 ms for the resetting of the communication conditions on the reader side and then transmits the "resume communication" message (S629) to start ordinary processing (S630).

(Reader Transmission Procedure)

Figure 7A:
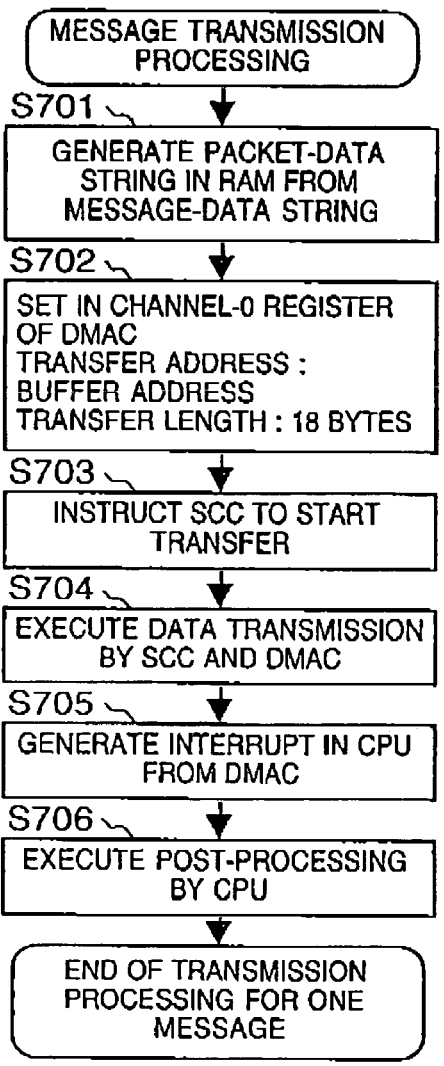
FIGS. 7A and 7B are flowcharts illustrating an example of processing for sending and receiving messages according to this embodiment.

A data transmission sequence according to the fixed-length packet scheme in the reader 200 shown in FIG. 1 will now be described with reference to the flowchart of FIG. 7A. In this embodiment, the procedure will be described taking a case in which PLen=8 bytes holds as an example, an 18-byte message, for example, being transmitted upon being divided into 8-byte packets.

Figure 8:
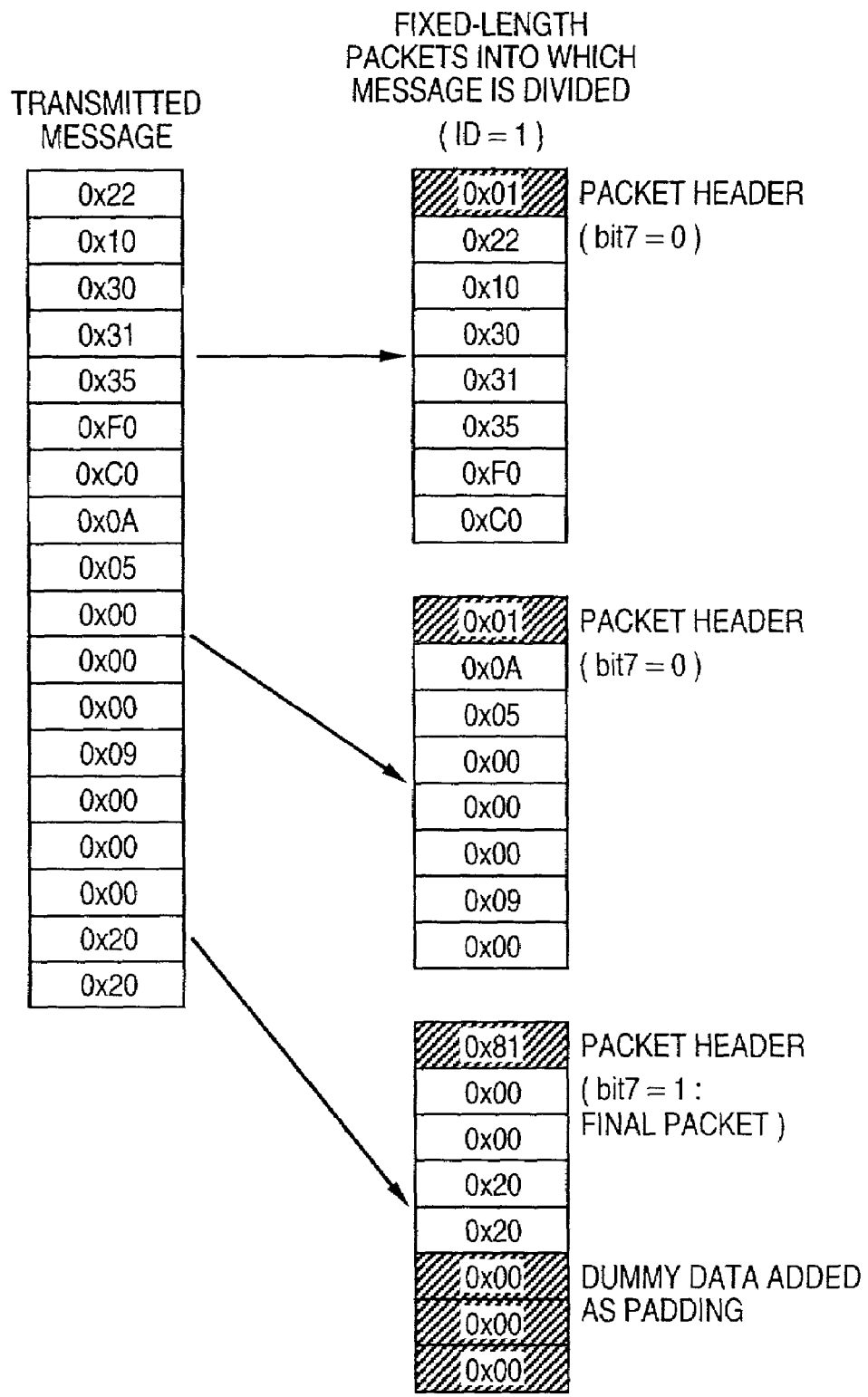
FIG. 8 is a diagram showing an example of the format of a transfer message and packets according to this embodiment.

First, an example of the data format of the packets will be described with reference to FIG. 8.

In the leading byte of each packet, message IDs are added onto the seven lower order bits and flag information indicative of the final packet is added onto the most significant bit. Accordingly, a 7-byte message can be transferred by an 8-byte packet. The 18-byte message is divided into three packets (7+7+4). In the final packet, 3-byte dummy data is added on as padding.

The CPU 240 generates this packet in the RAM 226 (S701), sets the leading address thereof and the transfer length (18 bytes) thereof in the channel-0 register of the DMAC 241 (S702) and instructs the SCU 242 to start transmission (S703).

Data transfer is carried out by the SCU 242 and DMAC 241 (S704). When a prescribed number of data transfers have been completed, the DMAC 241 applies an interrupt to the CPU 240 (S705) and the CPU 240 executes post-processing (S706).

Transmission of the message is thenceforth repeated through the same procedure.

(Reader Reception Procedure)

Figure 7B:
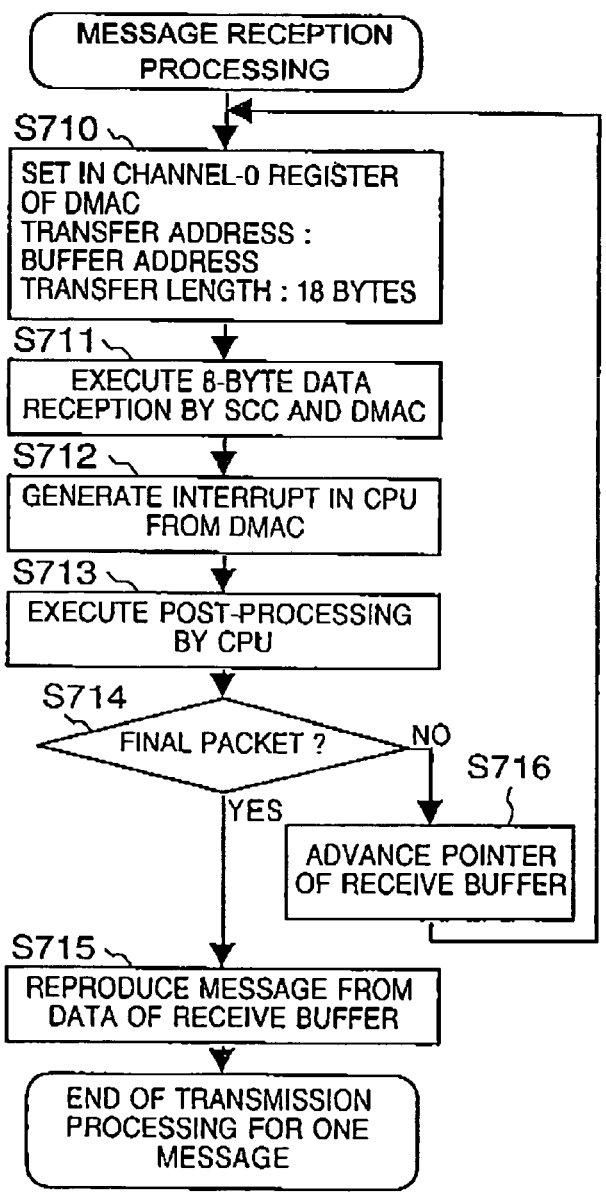

A data reception sequence according to the fixed-length packet scheme in the reader 200 will now be described with reference to the flowchart of FIG. 7B.

At the time of reception, the CPU 240 sets the fixed packet length of eight bytes, which was decided in the initialization sequence, in the channel-1 register of the DMAC 241 as the DMA transfer length and sets the address of a receive buffer provided in the RAM 226 in the channel-1 register of the DMAC 241 as the DMA transfer address (S710).

When data is transferred from the controller 110, an 8-btye receive operation is performed by the DMAC 241 and SCU 242 and the received data is transferred to the RAM 226 (S711). When transfer of eight bytes is completed, the DMAC 241 applies an interrupt to the CPU 240 (S712) and the CPU 240 executes post-processing (S713).

The CPU 240 checks "final-packet information" that has been added onto the packet (S714). If the CPU 240 recognizes that the packet is a final packet, it reproduced the original message (S715). If the packet is not the final packet, the CPU 240 advances the pointer of the receive buffer (S716) and control returns to the processing of step S710.

Message reception is thenceforth repeated through the same procedure.

In the example set forth above, communication negotiation processing (determination of fixed packet length) is executed by the reader, though this processing may be executed by the controller. However, in a case where a large number of structural elements have been connected to the system, executing the communication negotiation processing by the controller will take too much time. In such case it is preferred that the processing be executed on the side of each of the connected elements. Further, it is possible for data send/receive processing on the side of the controller 110 also to be carried out through exactly the same procedure.

Thus, in accordance with the embodiment as described above, by adopting a scheme in which a variable-length message is transferred upon being divided into fixed-length packets, it is possible to combine and control a DMA controller and a communication controller, thereby achieving high-speed data communication, even in a system not possessing a high-performance communication controller.

Further, depending upon the selection as to whether or not to implement a fixed-length packet scheme and the method of deciding the upper-limit value of packet length by negotiation between devices at the time of initialization, it is possible to realize a data communication scheme having greater versatility.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes, which have been stored on the storage medium, with a computer (or CPU or MPU) of the system or apparatus from the storage medium, and then executing the program codes. In this case, the program codes read from the storage medium implement the functions of the embodiment, and the storage medium storing the program codes constitutes the invention.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions of the embodiment by this processing.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the embodiment by this processing.

In a case where the present invention is applied to the above-described storage medium, program code corresponding to the flowcharts (shown in FIGS. 6A and 6B and/or FIGS. 7A and 7B) described earlier would be stored on this storage medium.

Thus, in accordance with this embodiment as described above, it is possible to provide a method and system for data communication between devices, wherein by adopting a scheme in which a variable-length message is transferred upon being divided into fixed-length packets, it is possible to combine and control a DMA controller and a communication controller, thereby achieving high-speed data communication, even in a low-cost single-chip microcomputer.

As many apparently widely different embodiments of the present invention can be made without departing from the spirit and scope thereof, it is to be understood that the invention is not limited to the specific embodiments thereof except as defined in the appended claims.

What is claimed is:

1. A data communication system comprising a first data communication unit, and a second data communication unit communicating with said first data communication unit, one of said first and second data communication units comprising:
    a deciding unit adapted to decide a fixed packet length based upon information related to an upper limit packet length in which a packet is capable of being transferred by said second data communication unit, and information related to an allowable packet length in which a packet is allowable of being transferred by said first data communication unit,
    wherein said first communication unit comprises:
    a generating unit adapted to generate a plurality of packets having said fixed packet length decided by said deciding unit, by dividing variable length data to be transferred from said first data communication unit to said second data communication unit into the plurality of packets;
    a storage unit adapted to store the plurality of packets generated by said generating unit; and
    a DMA controller adapted to control DMA transfer of the plurality of packets having said fixed packet length stored in said storage unit to said second data communication unit, and
    wherein said fixed packet length decided by said deciding unit is the smaller of said upper limit packet length and said allowable packet length.

2. The system according to claim 1, wherein said generating unit adds to each of the plurality of packets having said fixed packet length, information indicating whether the packet is a final packet.

3. The system according to claim 1, wherein said first data communication unit further comprises a first serial communication controller for controlling serial communication with a second serial communication controller of said second data communication unit, said first serial communication controller converting the packets transferred by said DMA controller to a bit string and outputting said bit string to said second serial communication controller.

4. The system according to claim 1, wherein said first data communication unit receives the information related to the upper limit packet length which is receivable by said second data communication unit, from said second data communication unit when said first data communication unit comprises said deciding unit, or said second data communication unit receives the information related to the allowable packet length from said first data communication unit when said second data communication unit comprises said deciding unit.

5. The system according to claim 1, wherein said deciding unit decides said fixed packet length in response to initialization of said data communication system.

6. The system according to claim 1, wherein said DMA controller further controls DMA transfer of the plurality of packets having said fixed packet length transmitted from said second data communication unit, to said storage unit.

7. The system according to claim 1, wherein said first data communication unit further comprises an image input unit for inputting image data, and said second data communication unit further comprises an image processing unit for processing image data input by said image input unit.

8. A data communication device for communicating with another data communication device, comprising:
　　a deciding unit adapted to decide a fixed packet length based upon information related to an upper limit packet length which is capable of being transferred by said another data communication device, and information related to an allowable packet length in which a packet is allowable of being transferred by said data communication device;
　　a generating unit adapted to generate a plurality of packets having said fixed packet length decided by said deciding unit, by dividing variable length data to be transferred from said data communication device to said another data communication device into the plurality of packets;
　　a storage unit adapted to store the plurality of packets generated by said generating unit; and
　　a DMA controller adapted to control DMA transfer of the plurality of packets having said fixed packet length stored in said storage unit, to said another data communication device,
　　wherein said fixed packet length decided by the deciding unit is the smaller of said upper limit packet length and said allowable packet length.

9. The device according to claim 8, wherein said generating unit adds to each of the plurality of packets having said fixed packet length, information indicating whether the packet is a final packet.

10. The device according to claim 8, further comprising a first serial communication controller for controlling serial communication with a second serial communication controller of said another data communication device, wherein said first serial communication controller converts the packets transferred by said DMA controller to a bit string and outputs said bit string to said second serial communication controller.

11. The device according to claim 8, wherein said data communication device receives said information related to the upper limit packet length which is receivable by said another data communication device, from said another data communication device.

12. The device according to claim 8, wherein said deciding unit decides said fixed packet length in response to initialization of said data communication device.

13. The device according to claim 8, wherein said DMA controller further controls DMA transfer of the plurality of packets having said fixed packet length transmitted to said another data communication device, to said storage unit.

14. A data communication method for communication between a first data communication unit and a second data communication unit, comprising the steps of:
　　a deciding step of deciding a fixed packet length based upon information related to an upper limit packet length which is capable of being transferred by said second data communication unit and information related to an allowable packet length in which a packet is allowable of being transferred by said first data communication unit;
　　a generating step of generating a plurality of packets having said fixed packet length, by dividing variable length data to be transferred from said first data communication unit to said second data communication unit into the plurality of packets;
　　a storing step of storing the plurality of packets generated in said generating step to a storage unit of said first data communication unit; and
　　a control step of controlling DMA transfer of the plurality of packets having said fixed packet length stored in said storage unit from said first data communication unit to said second data communication unit,
　　wherein said fixed packet length decided by the deciding step is the smaller of said upper limit packet length and said allowable packet length.

\* \* \* \* \*